US012273396B2

(12) United States Patent
Shahdad et al.

(10) Patent No.: US 12,273,396 B2
(45) Date of Patent: Apr. 8, 2025

(54) IMS AND VOICE SERVICE IMPLEMENTATION IN STANDALONE CELLULAR NETWORKS OVER A PUBLIC CLOUD

(71) Applicants: DISH Wireless L.L.C., Englewood, CO (US); DISH Network Technologies India Private Limited, Bangalore (IN)

(72) Inventors: Mohammad Dawood Shahdad, Aurora, CO (US); Sruthi Nair, Aurora, CO (US); Jaya Chandra Chikatmarla, Highlands Ranch, CO (US); Krupal Kumar Patel, Parker, CO (US); Kumar Anshuman, Bangalore (IN)

(73) Assignees: DISH Wireless L.L.C., Englewood, CO (US); DISH Network Technologies India Private Limited, Bangalore (IN)

( * ) Notice: Subject to any disclaimer, the term of this patent is extended or adjusted under 35 U.S.C. 154(b) by 0 days.

(21) Appl. No.: 18/463,071

(22) Filed: Sep. 7, 2023

(65) Prior Publication Data
US 2025/0088545 A1    Mar. 13, 2025

(51) Int. Cl.
*H04L 65/1016* (2022.01)
*H04L 65/1045* (2022.01)

(52) U.S. Cl.
CPC ...... *H04L 65/1016* (2013.01); *H04L 65/1045* (2022.05)

(58) Field of Classification Search
CPC . H04L 65/1016; H04L 65/1104; H04L 67/14; H04L 65/1045; H04L 65/1096
See application file for complete search history.

(56) References Cited

U.S. PATENT DOCUMENTS

| | | | |
|---|---|---|---|
| 12,021,904 B1* | 6/2024 | Corona | H04L 63/08 |
| 2017/0052807 A1* | 2/2017 | Kristiansson | G06F 8/60 |
| 2020/0204599 A1* | 6/2020 | Ravichandran | H04L 65/1104 |
| 2021/0226838 A1* | 7/2021 | Hegarty | H04L 65/1069 |
| 2022/0094548 A1* | 3/2022 | Asveren | H04L 9/3213 |
| 2022/0312301 A1* | 9/2022 | Christopherson | H04W 48/16 |
| 2023/0055658 A1* | 2/2023 | Yao | H04W 24/08 |
| 2023/0062145 A1* | 3/2023 | Sabeur | H04W 8/20 |

(Continued)

OTHER PUBLICATIONS

Prasad et al.; Who's Calling? Characterizing Robocalls through Audio and Metadata Analysis; Aug. 12, 2020; Usenix Security Symposeum; pp. 1-19. (Year: 2020).*

*Primary Examiner* — Schquita D Goodwin
*Assistant Examiner* — Linh T. Nguyen
(74) *Attorney, Agent, or Firm* — Quarles & Brady, LLP

(57) ABSTRACT

Systems and methods are provided for implementing an IP multimedia services or subsystem ("IMS") within a communication network. One system may include a server configured to facilitate multimedia communication services via the IMS. The server may include a memory storing an integrated IMS function and an electronic processor communicatively coupled to the memory. The electronic processor may be configured to receive, with the integrated IMS function, a request to establish a multimedia communication session for a user equipment ("UE") device over the communication network; and establish and control, with the integrated IMS function, the multimedia communication session for UE device over the communication network.

19 Claims, 8 Drawing Sheets

(56) References Cited

U.S. PATENT DOCUMENTS

| | | | |
|---|---|---|---|
| 2023/0141522 A1* | 5/2023 | Sinha | H04W 8/08 |
| | | | 455/414.1 |
| 2023/0156049 A1* | 5/2023 | Cataquis | H04L 61/4557 |
| | | | 709/227 |
| 2023/0239665 A1* | 7/2023 | Badar | H04M 15/50 |
| | | | 455/406 |
| 2024/0073254 A1* | 2/2024 | Dauneria | H04L 65/1059 |
| 2024/0259437 A1* | 8/2024 | Corona | H04L 65/1069 |
| 2024/0275825 A1* | 8/2024 | Filart | H04L 65/1069 |

* cited by examiner

IMS AND VOICE SERVICE IMPLEMENTATION IN STANDALONE CELLULAR NETWORKS OVER A PUBLIC CLOUD

BACKGROUND

This disclosure relates to wireless data networks, such as 5G wireless networks. Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers, and other devices. 5G technologies are capable of supplying much greater bandwidths than was previously available.

The discussion above is merely provided for general background information and is not intended to be used as an aid in determining the scope of the claimed subject matter.

SUMMARY

This disclosure is in the field of cellular network management, and more particularly, in the field of managing the use of resources in a cellular network to carry out a number of network functions over public cloud.

According to the present disclosure, IP multimedia services or subsystems ("IMS") and voice services may be simplified and standardized within a cellular network, such as, e.g., a 5G standalone network, on a public cloud by implementing a plurality of network functions ("NFs") in a single server.

Accordingly, the technology disclosed herein may provide IMS and voice service simplification and standardization in a 5G standalone network on a public cloud. One configuration may provide a system of implementing an IP multimedia services or subsystem ("IMS") within a communication network. The system may include a server configured to facilitate multimedia communication services via the IMS. The server may include a memory storing an integrated IMS function and an electronic processor communicatively coupled to the memory. The electronic processor may be configured to receive, with the integrated IMS function, a request to establish a multimedia communication session between two or more user equipment ("UE") devices over the communication network. The electronic processor may be configured to establish, with the integrated IMS function, the multimedia communication session. The electronic processor may be configured to control, with the integrated IMS function, the multimedia communication session between the two or more UE devices over the communication network.

Another configuration may provide a method of implementing an IP multimedia services or subsystem ("IMS") within a communication network. The method may include receiving, with an electronic processor via the integrated IMS function, a request to establish the multimedia communication session for a user equipment ("UE") device over the communication network. The method may include establishing, with the electronic processor via the integrated IMS function, the multimedia communication session based on the request. The method may include controlling, with the electronic processor via the integrated IMS function, the multimedia communication session for the UE device over the communication network.

Yet another configuration may provide a non-transitory, computer-readable medium storing instructions that, when executed by an electronic processor, perform a set of functions. The set of functions may include receiving, with an integrated IP multimedia services or subsystem ("IMS") function, a request to establish the multimedia communication session for a user equipment ("UE") device over the communication network. The set of functions may include establishing, with the integrated IMS function, the multimedia communication session based on the request. The set of functions may include controlling, with the integrated IMS function, the multimedia communication session for the UE device over the communication network.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The following drawings are provided to help illustrate various features of examples of the disclosure and are not intended to limit the scope of the disclosure or exclude alternative implementations.

DETAILED DESCRIPTION OF THE PRESENT DISCLOSURE

Figure 1:
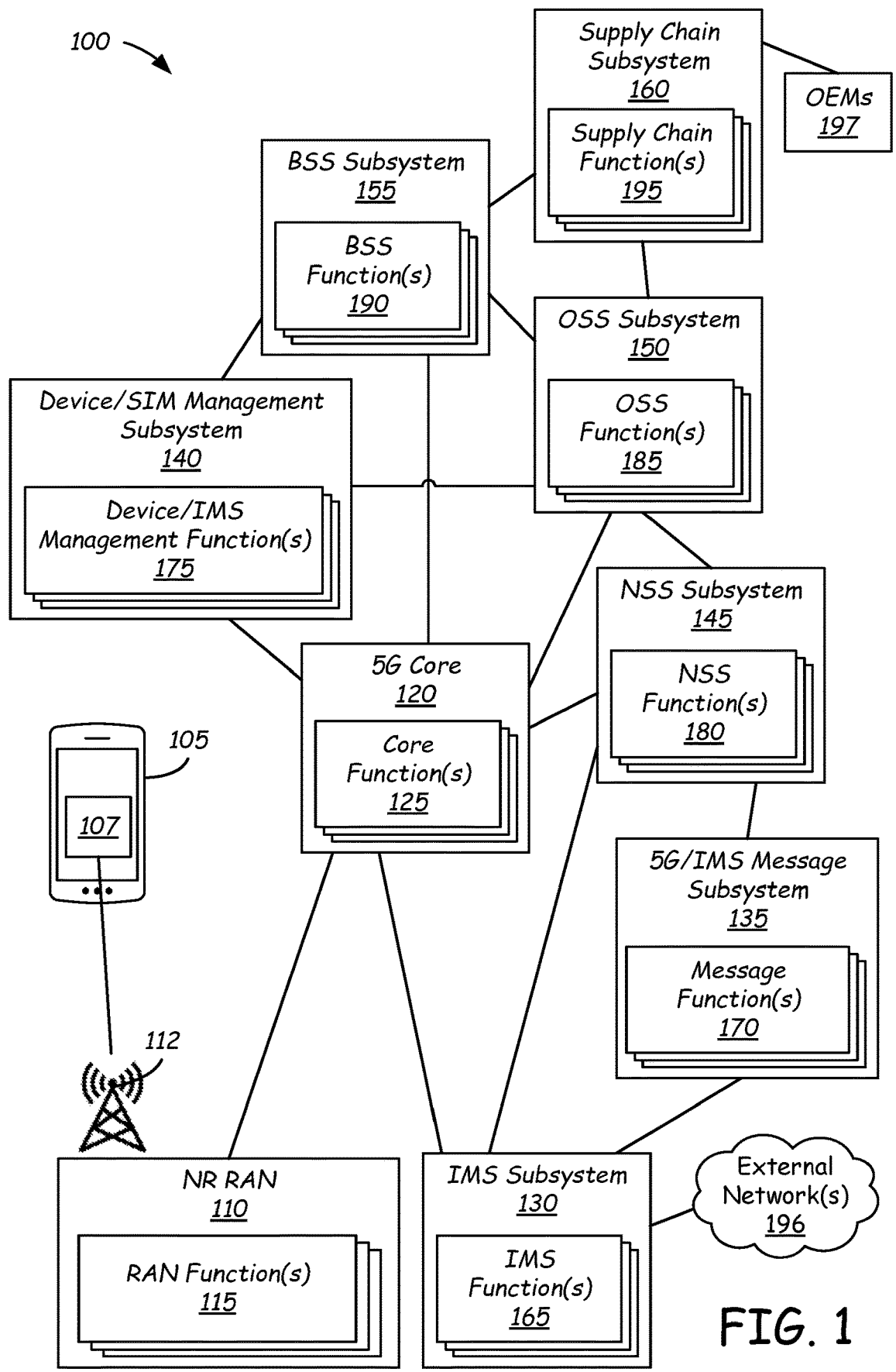
FIG. 1 schematically illustrates an architecture of an example wireless communication network according to some configurations.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways. The terminology in this document is used for the purpose of description and should not be regarded as limiting. Words such as "including," "comprising," and "having" and variations thereof as used herein are meant to encompass the items listed thereafter, equivalents thereof, as well as additional items.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

As noted herein, the technology disclosed herein relates to cellular network management, and more particularly, to implementation of IP multimedia services or subsystem ("IMS") and voice services in a 5G standalone network over a public cloud such that the implementation of the IMS and voice services is simplified and standardized. For instance, in some configurations, the technology disclosed herein facilitates the implementation of multiple network functions ("NFs") within a node of a public cloud.

Some cellular networks facilitate NFs by implementing each NF as a separate, individual node. For instance, in some cellular networks, each NF is run on a dedicated datacenter or server. An IMS may be implemented via multiple NFs. Accordingly, an IMS may be implemented across multiple dedicated datacenters or servers, where each datacenter or server is specifically dedicated to running a corresponding NF of the IMS. In other words, some cellular networks or IMSs may be implemented using a distributed or decentralized architectural framework.

However, implementing an IMS via a distributed or decentralized architectural framework introduces technical challenges and problems with respect to implementation of an IMS and video services. For instance, a decentralized architectural framework may be complex to deploy, integrate, maintain, and operate due to the distribution of NFs across multiple nodes within a network. Additionally, a decentralized architectural framework may impose additional technical challenges and problems, such as, e.g., increased hardware utilization on the public cloud, increased capital and operating costs, increased complexities of integration and troubleshooting, and increased operation friction as each node may have its own specific operations, administration, and maintenance ("OAM") specifications, which may, ultimately, be cumbersome for operation. Further, a decentralized architectural framework may increase latency of communication between the NFs of the IMS based on the physical and logical separation between NFs, reducing performance of the IMS.

The technology disclosed herein solves at least the above technical problems and challenges by simplifying and standardizing the implementation of IMS and voice services in a network, including, e.g., a 5G standalone network, over a public cloud. In some configurations, the IMS may be implemented using an integrated IMS function to facilitate delivery of multimedia communication, such as, e.g., voice, video, or text messaging, over IP networks. From the perspective of devices interacting with the integrated IMS function, the integrated IMS function may provide overall network functionality similar to the network functionality provided by the individual nodes or servers in a decentralized or distributed architectural framework. However, the integrated IMS function, relative to the decentralized or distributed architecture framework, offers several technical advantages including one or more of reduced complexity, reduced footprint in terms of hardware volume and costs, simplified maintenance and upkeep due to co-location of NF functions, reduced latency and fewer hops of inter-NF communications and, thus, of the functions performed by the IMS.

Accordingly, the technology disclosed herein provides multiple IMS network functions in a single integrated network function, which simplifies the complexity of handling multiple network functions on cloud native principles on a 5G public cloud. Use of a single integrated IMS network function decreases the footprint of IMS and voice services and simplifies the integration, operation, and maintenance of IMS and voice services. Further, the technology disclosed herein reduces the hardware footprint, reduces integration points to external interfaces, and reduces costs while also increasing reliability, speed, and scalability.

FIG. 1 illustrates an architecture of an example wireless communication network 100 according to some configurations. The wireless communication network 100 may be used to facilitate multiple types of communication sessions, such as, e.g., voice calls, video calls, messaging (e.g., Short Message Service ("SMS") messaging, Multimedia Messaging Service ("MMS") messaging, group messaging, etc.), and/or other types of communications.

The wireless communication network 100 may represent a portion of a wireless network built around 5G standards promulgated by standards setting organizations under the umbrella of the Third Generation Partnership Project ("3GPP"). Accordingly, in some configurations, the wireless communication network 100 may be a 5G network, such as, e.g., a 5G cellular network. Such 5G networks, including the wireless communication network 100, may comply with industry standards, such as, e.g., the Open Radio Access Network ("Open RAN" or "O-RAN") standard that describes interactions between the network and user equipment (e.g., mobile phones and the like). The O-RAN model follows a virtualized model for a 5G wireless architecture in which 5G base stations ("gNBs") are implemented using separate centralized units ("CUs"), distributed units ("DUs"), and radio units ("RUs"). In some configurations, O-RAN CUs and DUs may be implemented using software modules executed by distributed (e.g., "cloud") computing hardware.

In some configurations, the wireless communication network 100 may be a standalone ("SA") network (e.g., a 5G SA network) that utilizes 5G cells for both signaling and information transfer via a 5G packet core architecture. In other configurations, the wireless communication network 100 may be a non-standalone ("NSA") network that depends on another network, such as, e.g., a control plane of a fourth generation ("4G") long-term evolution ("LTE") network.

While certain aspects are described with relation to a 5G network, techniques described herein can similarly be applied to other types of communication networks, such as a third generation ("3G") network, 4G LTE network, etc. For the sake of illustration, a user equipment ("UE") device 105, such as a smartphone, is illustrated as deploying a new radio ("NR") 107 designed to communicate with a NR radio access network ("RAN") 110 of the wireless communication network 100 (e.g., as a 5G network). The NR 107 can communicate with the NR RAN 110 in various ways, such as, for example, via a radio transceiver 112, which may also be referred to as a radio unit ("RU") in the O-RAN architecture.

The NR RAN 110 (or "Next Generation RAN") can enclose a future-proof software offering that co-exists with deployed LTE networks and smoothly prepares the migration from LTE to NR. The NR RAN 110 may be or include a disaggregated RAN (referred to as an "Open RAN," or "O-RAN") which can include hierarchy (e.g., tree structure) of RAN functions 115. In such examples, the NR RAN 110 may include one or more CUs and one or more DUs. For example, each of multiple CUs may be coupled with multiple DU, and each DU may be coupled with multiple RUs (e.g., the radio transceiver 112). As such, each NR 107 can communicate with a backhaul network infrastructure (e.g., a 5G Core 120) according to an assigned communication path through a particular RU, DU, and CU. An RU (e.g., the radio transceiver 112) in combination with a DU and CU may be referred to as a gNodeB ("gNB") in the O-RAN architecture. Such a gNB may be a 3GPP 5G next generation base station that supports communications with the 5G NR 107 of the UE device 105. The NR RAN 110 can include additional RAN functions 115, such as a real-time RAN intelligent controller ("RIC"), a non-real-time RIC, etc.

As illustrated in FIG. 1, the wireless communication network 100 may include one or more network functions ("NFs"). The wireless communication network 100 may include diverse types of NFs. A NF may provide a specific utility to the wireless communication network 100. For instance, different NFs may provide different utility to the wireless communication network 100. For example, a User Plane Function ("UPF") NF may provide packet routing and data access to a UE, such as, e.g., a cellphone. In some configurations, the wireless communication network 100 (or portions thereof) may be disaggregated, such that, e.g., NFs may be developed, deployed, or operated by multiple vendors or operators. In some configurations, an NF may be virtualized. An NF may be virtualized by implementing the NF in a cloud-native architecture. Accordingly, in some configurations, an NF may be a cloud-native NF ("CNF"). A CNF may refer to a service (or utility) that performs network duties in software (e.g., as opposed to purpose-built hardware).

For example, the 5G Core 120 can generally include one or more core functions 125 (referred to herein collectively as "the core functions 125" and individually as "the core function 125"). The core function 125 may be an NF that provides a utility or service specific to the 5G Core 120. For example, although not illustrated in FIG. 1, the core function(s) 125 may include: a Home Subscriber Server ("HSS"), which can be a main database of a current generation cellular communications system: an Equipment Identity Register ("EIR") function: a policy control function ("PCF"), which can apply session policies for the UE device 105, or other devices when connecting over 4G or 5G: a Unified Data Management ("UDM") function, which can manage network user data in a single, centralized element, and can be similar to the HSS in a cloud-native implementation designed specifically for 5G: a User Plane Function ("UPF"), which can perform user plane operations, like maintaining protocol data unit ("PDU") sessions, packet routing and forwarding, packet inspection, policy enforcement for the user plane, quality of service ("QoS") handling, etc.: a Network Repository Function ("NRF"): a Network Exposure Function ("NEF"), which can expose services and resources over application programming interfaces ("APIs") within and outside the 5G Core 120, a Network Slice Selection Function ("NSSF"), which can provide tailor made logical networks on the physical network: an Authentication Server Function ("AUSF"); a Location Management Function ("LMF"); a Gateway Mobile Location Center ("GMLC") function: an Access and Mobility Management Function ("AMF"), which can perform operations like mobility management, registration management, connection management, UE-based authentication, etc.: a Session Management Function ("SMF"), which can perform internet protocol ("IP") address allocation and management for UEs 105, user plane selection, and packet routing in conjunction with the UPF: etc.

In the illustrated example of FIG. 1, behind the 5G Core 120, the wireless communication network 100 can include one or more different types of functional subsystems, such as, e.g., an IMS 130, a 5G/IMS Messaging Subsystem 135, a Device and Subscriber Identification Module ("SIM") ("Device/SIM") Management Subsystem 140, a Network Service Systems ("NSS") Subsystem 145, an Operation Support Systems ("OSS") Subsystem 150, a Business Support Systems ("BSS") Subsystem 155, a supply chain subsystem 160, etc.

The IMS 130 may be a standardized architectural framework for delivering multimedia communication services, such as, e.g., voice, video, and text messaging, over IP networks. The IMS 130 can include one or more IMS functions 165 (referred to herein collectively as "the IMS functions 165" and individually as "the IMS function 165"). In some configurations, the IMS function 165 may be a NF or CNF that provides a utility or service specific to the IMS 130. For example, the IMS functions 165 may facilitate the delivery of multimedia communication services.

For example, although not illustrated in FIG. 1, the IMS function(s) 165 may include: a Proxy Call Session Control Function ("P-CSCF"), which can behave as a session initiation protocol ("SIP") proxy by forwarding SIP messages between the UE device 105 and the 5G Core 120: an Interrogating Call Session Control Function ("I-CSCF"), which can interrogate the HSS to determine to which suitable Call Session Control Function ("CSCF") to route the request for registration: a Serving Call Session Control Function ("S-CSCF"), which can provide session set-up, provide session tear-down, provide session control and routing functions, generate records for billing purposes for all sessions under its control, etc.: an Emergency Call Routing ("ECR") function: a Breakout Gateway Control Function ("BGCF"), which can be responsible for determining the next hop for routing of SIP messages: a Media Gateway Control Function ("MGCF"), which can be used to interact with a public switched telephone network ("PSTN"): an IMS Media Gateway ("IMS-MGW"), which can handle voice functions, such as by making protocol translations to support a voice call: a Session Border Control ("SBC") function: an Interconnect Border Control Function ("IBCF"), which can be an SBC specialized for network-to-network interfaces ("NNIs"), offers boundary control between various service provider networks, and provides IMS network security in terms of signaling information: a Media Resource Function ("MRF"): etc.

The 5G/IMS Messaging Subsystem 135 can include one or more messaging functions 170 (referred to herein collectively as "the messaging functions 170)" and individually as "the messaging function 170"). The messaging function 170 may be a NF (or CNF) that provides a utility or service specific to the 5G/IMS Messaging Subsystem 135. For example, although not illustrated in FIG. 1, the messaging function(s) 170 may include: a Short Message Service Center ("SMSC") function, a Multimedia Message Service Center ("MMSC") function, a Voicemail function, a Visual Voicemail ("VVM") function, a Rich Communications Services Application Server ("RCS AS") function, etc.

The Device/SIM Management Subsystem 140 can include one or more Device/SIM Management functions 175 (referred to herein collectively as "the Device/SIM Management functions 175" and individually as "the Device/SIM Management function 175"). The Device/SIM Management function 175 may be an NF (or CNF) that provides a utility or service specific to the Device/SIM Management Subsystem 140. For example, although not illustrated in FIG. 1, Device/SIM Management function(s) 175 may include: an Automatic Device Detection ("ADD") function, an Entitlement Server, etc.

The NSS Subsystem 145 can include one or more NSS functions 180 (referred to herein collectively as "the NSS functions 180" and individually as "the NSS function 180"). The NSS function 180 may be an NF (or CNF) that provides a utility or service specific to the NSS Subsystem 145. For example, although not illustrated in FIG. 1, the NSS function(s) 180) may include: a Network Assurance function, a Network Inventory function, a Provisioning and Activation function, Network Slice Composition functions (e.g., including a Network Service Orchestration function, a Network Slice Subnet Management Function ("NSSMF"), etc.), etc.

The OSS Subsystem 150 can include one or more OSS functions 185 (referred to herein collectively as "the OSS functions 185" and individually as "the OSS function 185"). The OSS function 185 may be an NF (or CNF) that provides a utility or service specific to the OSS Subsystem 150. For example, although not illustrated in FIG. 1, the OSS function(s) 185 may include: a Coverage Management function, a Service Assurance function, a Local Service Management System ("LSMS") function (which can be a database with latest location routing number ("LRN") information used by local number portability ("LNP") for routing), etc.

The BSS Subsystem 155 can include one or more BSS functions 190 (referred to herein collectively as "the BSS functions 190" and individually as "the BSS function 190"). The BSS function 190 may be an NF (or CNF) that provides a utility or service specific to the BSS Subsystem 155. For example, although not illustrated in FIG. 1, the BSS function(s) 190 may include: a Wholesale Platform function, a customer resource management ("CRM") function, a billing function, a mediation function, a "Configure, Price, Quote" ("CPQ") function, etc.

The supply chain subsystem 160 can include one or more supply chain functions 195 (referred to herein collectively as "the supply chain functions 195" and individually as "the supply chain function 195"). The supply chain function 195 may be an NF (or CNF) that provides a utility or service specific to the supply chain subsystem 160. For example, although not illustrated in FIG. 1, the supply chain function(s) 195 may include: an Inventory System function, a Forecasting function, a Warehouse Management function, an Asset Tracking function, a Workforce Management function, etc.

In some examples, the wireless communication network 100 can include fewer, additional, or different components in different configurations than illustrated in FIG. 1. For example, in some configurations, the wireless communication network 100 may include additional or different UE devices 105. As another example, the wireless communication network 100 may include additional, fewer, or different functional subsystems than illustrated in FIG. 1. As yet another example, one or more components of the wireless communication network 100 can be combined into a single device, divided among multiple devices, or a combination thereof. As yet another example, in some configurations, in addition to the functional subsystems and the NFs considered to be part of the wireless communication network 100, there can be one or more interfaces between the wireless communication network 100 and external functions. For example, the LSMS function in the OSS Subsystem 150 can interface with one or more Number Portability Administration Centers ("NPACs"), the IMS 130 can support NNIs with one or more external networks 196 (e.g., PSTNs, other IMS networks, voice over IP ("VOIP") networks, peering networks, etc.), the GMLC function of the 5G Core 120 can interface with one or more external clients, the supply chain subsystem 160 can interface with one or more original equipment manufacturers ("OEMs") 197, etc.

As described herein, the IMS 130 may provide an architectural framework for delivering multimedia communication services, such as, e.g., voice, video, and text messaging, over IP networks. The IMS 130 may facilitate delivery of multimedia communication services via the IMS function(s) 165. The IMS function(s) 165 may run on one or more data centers. A data center may include a collection of one or more dedicated computing devices or systems, including, e.g., databases, servers, etc. A data center may be an edge data center, a regional data center, a national data center, etc. In some instances, a data center may be co-located or integrated with a base station, a node, etc. of a corresponding network (e.g., the wireless communication network 100). In some examples, a data center may be a single device, such as, e.g., a server, a computing device, etc.

In some configurations, the IMS 130 may have a centralized or integrated architectural framework where each IMS function 165 may be implemented via the same server as opposed to a decentralized architectural framework where each of the IMS functions 165 is individually implemented via a different server, such that the IMS 130 is implemented across multiple servers.

Figure 2:
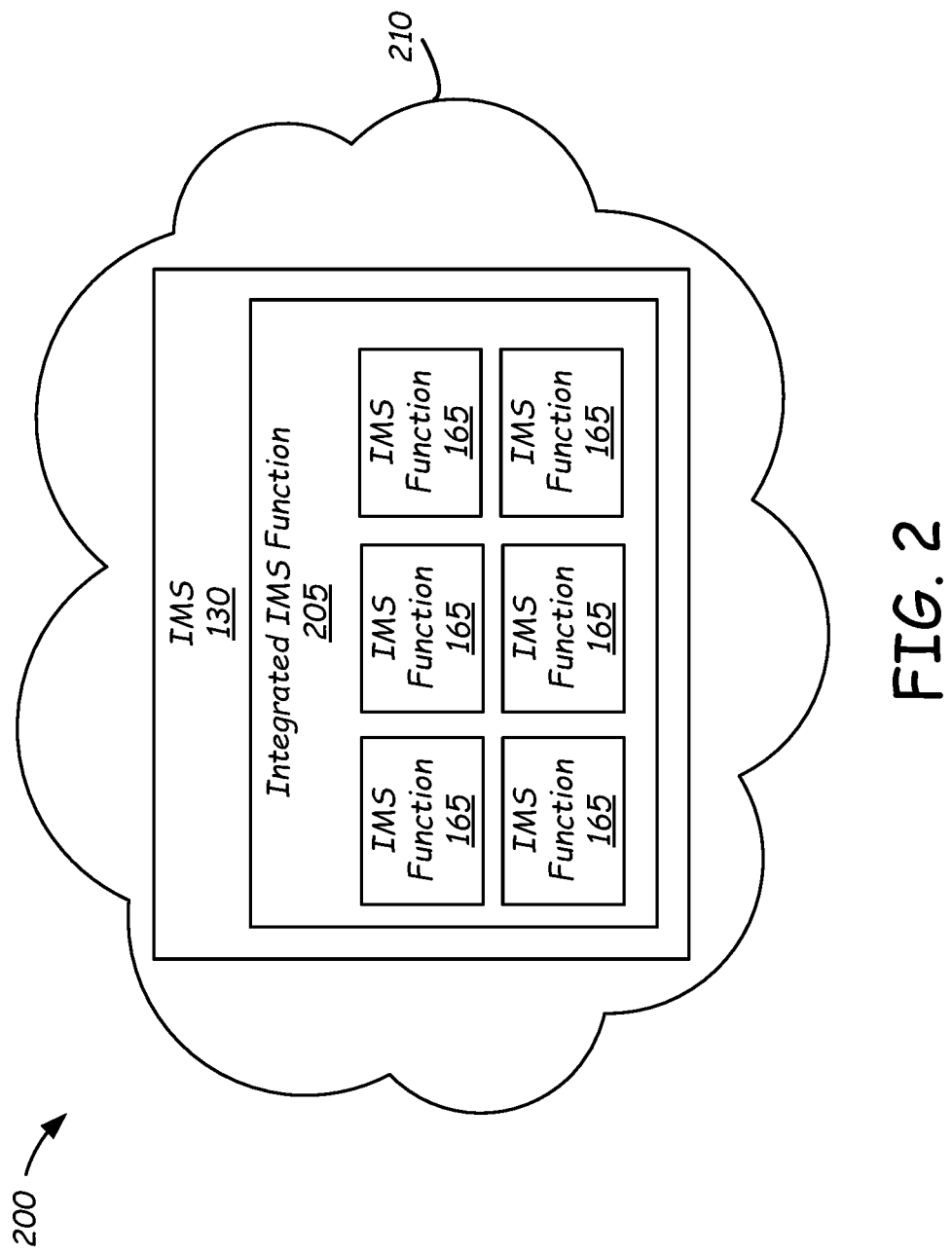
FIG. 2 schematically illustrates an example integrated architectural framework for an IMS in accordance with some configurations.

For example, FIG. 2 illustrates an example integrated architectural framework 200 for the IMS 130 in accordance with some configurations. As illustrated in the example of FIG. 2, the IMS functions 165 may be integrated into a single NF that provides the functionality of the IMS functions 165. For example, as illustrated in FIG. 2, the IMS 130 may be implemented via an integrated IMS function 205, where the integrated IMS function 205 provides the functionality of the individual IMS functions 165. In some configurations, each of the individual IMS functions 165 may be IMS micro services that are combined into a single NF (or CNF), such as, e.g., the integrated IMS function 205. Accordingly, in some examples, the integrated IMS function 205 may be a single NF (or CNF) that includes multiple IMS micro services (e.g., where each IMS micro service provides the functionality of an individual IMS function 165). In some instances, the IMS 130 may be implemented using a cloud-base service or network, such as, e.g., a public cloud, as illustrated in FIG. 2 by reference numeral 210). Accordingly, in some configurations, the integrated IMS function 205 may be implemented in a cloud-native architecture (e.g., as illustrated in FIG. 2). In such configurations, the integrated IMS function 205 may be a CNF that performs (or otherwise provides) network functionality via software (e.g., as opposed to purpose-built hardware).

In some configurations, the IMS 130 may be implemented via a single server. For instance, the IMS 130 may facilitate delivery of multimedia communication services via the integrated IMS function 205, where the integrated IMS function 205 runs on a single server.

Figure 3:
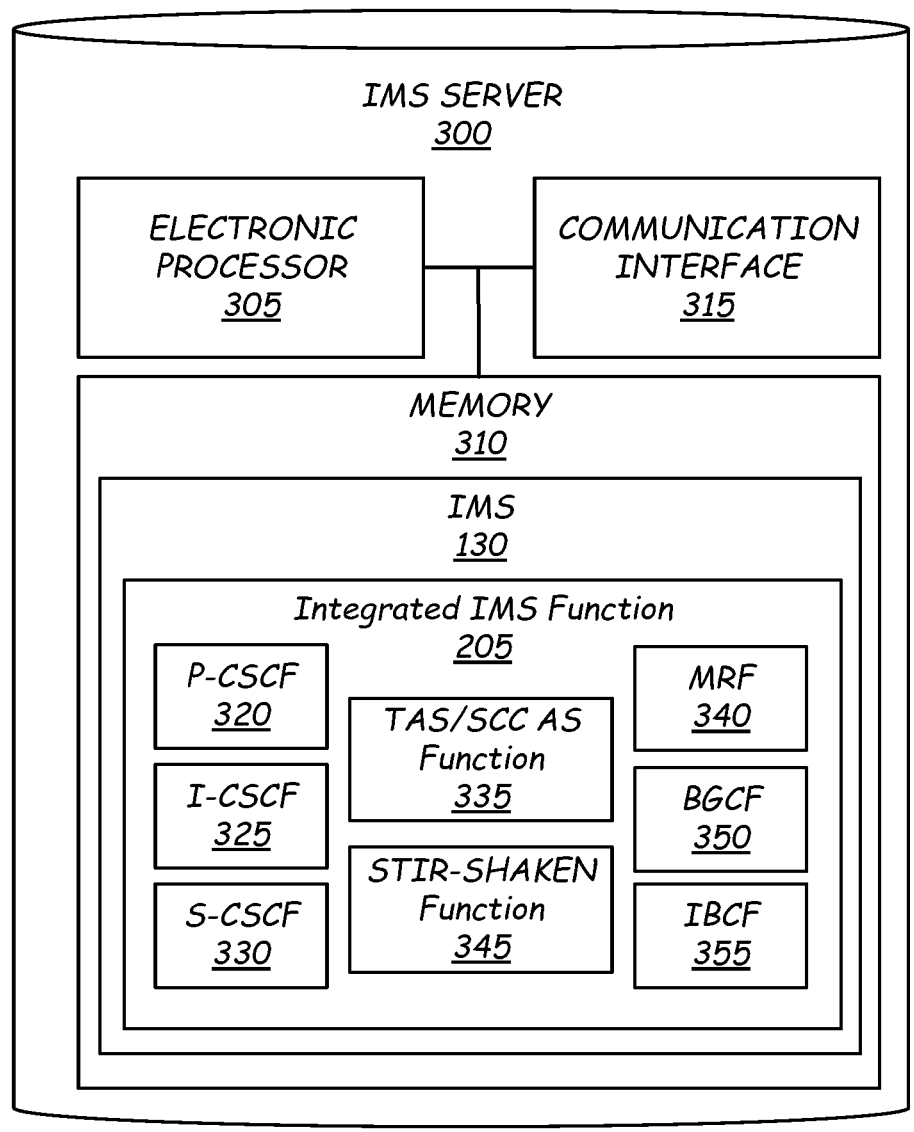
FIG. 3 illustrates an example IMS server for implementing the centralized architectural framework for the IMS in accordance with some configurations.

For example, FIG. 3 illustrates an example IMS server 300 for implementing the centralized architectural framework 200 for the IMS 130 (e.g., the integrated IMS function 205) in accordance with some configurations. As illustrated in FIG. 3, the IMS server 300 may include an electronic processor 305 a memory 310, and a communication interface 315. The electronic processor 305, the memory 310, and the communication interface 315 can communicate wirelessly, over one or more communication lines or buses, or a combination thereof. The IMS server 300 can include additional, different, or fewer components than those illustrated in FIG. 3 in various configurations. The IMS server 300 can perform additional functionality other than the functionality described herein.

The communication interface 315 can include a transceiver that communicates with external or remote devices. For example, the communication interface 315 enables the IMS server 300 (e.g., the electronic processor 305) to communicate with the 5G Core 120 (see FIG. 1) and/or other subsystems as shown in FIG. 1. The communications may be via a network and may include wired or wireless transmissions and protocols or a combination thereof.

The electronic processor 305 may include one or more processors, processor cores, processing elements, processor clusters, or other electronic processing units. Accordingly, a processing function described herein as being performed by the electronic processor 305 may include multiple processors, processor cores, processing elements, processor clusters, etc. (of the electronic processor 305) performing aspects or portions (sub-functions) of the processing function to complete the processing function. The one or more electronic processing units of the electronic processor 305 may include one or more microprocessors, application-specific integrated circuits ("ASICs"), or other suitable electronic device for processing data. At least in some examples, the one or more electronic processing units of the electronic processor 305 are co-located physically (e.g., in the same facility, building, room, rack, or computing housing) as part of the IMS server 300. The electronic processor 305 is configured to retrieve instructions and data from the memory 310 and execute the instructions to, for example, carry out the functions of the electronic processor 305 (and the IMS server 300) described herein.

The memory 310 includes a non-transitory, computer-readable storage medium. The memory 310 may be a memory system including multiple memories or data stores. The memory may store data and/or instructions for use and execution by the IMS server 300 (e.g., by the electronic processor 305) to implement the functionality of the IMS server 300 described herein. For example, as illustrated in FIG. 3, the memory 310 may include or store the IMS 130, including, e.g., the integrated IMS function 205. In the example of FIG. 3, the integrated IMS function 205 may include a P-CSCF 320, an I-CSCF 325, a S-CSCF 330, a telephony application server or service centralization and continuity application server ("TAS/SCC AS") function 335, a media resource function ("MRF") 340, a STIR-SHAKEN function 345, a BGCF 350, and an IBCF 355, each of which is an example of an IMS function 165 (see FIG. 2). In some examples, the integrated IMS function 205 can provide fewer, additional, or different NFs (e.g., network functions) in different configurations than illustrated in FIG. 3. For example, as illustrated, the integrated IMS function 205 provides functionality of eight IMS functions 165. However, in some examples, the integrated IMS function 205 may provide functionality of fewer or additional IMS functions 165.

As noted herein, in some configurations, the integrated IMS function 205 may be a CNF that performs (or otherwise provides) network functionality via software (e.g., by execution of the software by the electronic processor 305). Accordingly, in some configurations, the IMS server 300 (e.g., via the integrated IMS function 205) may provide the network functionality of the IMS functions 165 (e.g., the P-CSCF 320, the I-CSCF 325, the S-CSCF 330, the TAS/SCC AS function 335, the MRF 340, the STIR-SHAKEN function 345, the BGCF 350, the IBCF 355, etc.) via software stored in, e.g., the memory 310. For example, the integrated IMS function 205 may provide network functionality that emulates network functionality provided by individual servers running NFs, although with the advantages of an integrated IMS described herein. Accordingly, other devices in the wireless communication network 100 may interact with the integrated IMS function 205 in a similar way to interacted with a distributed IMS, but may experience improved performance with the integrated IMS function (e.g., lower latency, higher reliability, etc.). As one specific example, for the MRF 340, the integrated IMS function 205 may provide the network functionality of the MRF 340) within software such that the integrated IMS function 205 emulates the network functionality that would be provided by a server running the MRF 340 (e.g., the integrated IMS function 205 may emulate a server dedicated to running the MRF 340).

In the illustrated example of FIG. 3, the integrated IMS function 205 may include one or more CSCFs. A CSCF may process SIP signaling packets in the IMS 130. In the illustrated example of FIG. 3, the IMS 130 may include the P-CSCF 320, the I-CSCF 325, and the S-CSCF 330.

The P-CSCF 320 may behave as a SIP proxy by, e.g., forwarding SIP messages between the UE device 105 and the 5G Core 120. The P-CSCF 320 may function as a specialized SBC for the user-network interface that protects the network and the IMS terminal (e.g., the UE device 105 of FIG. 1). In some configurations, the P-CSCF 320 may provide policy control via, e.g., a Policy Decision Function ("PDF"), provide bandwidth management, compress and decompress SIP messages, inspect signals, etc. In some configurations, the P-CSCF 320 may communicate with the UE device 105 via the Gm interface, which carries SIP/session description protocol ("SDP") signaling. In some configurations, the P-CSCF 320 may communicate with the I-CSCF 325, the S-CSCF 330, or a combination thereof via the Mw interface.

The I-CSCF 325 may interrogate the HSS to determine to which suitable CSCF to route a request for registration. For instance, the I-CSCF 325 may determine which S-CSCF 330 to assign for controlling a session requested by the UE device 105 and may route SIP messages to the appropriate S-CSCF 330. For example, the I-CSCF 325 may query the HSS (or a user profile server function ("UPSF")) to retrieve an address of the S-CSCF 330 and assign the address to a user performing SIP registration and may forward SIP requests or responses to the S-CSCF 330. In some configurations, the I-CSCF 325 may communicate with the P-CSCF 320, the S-CSCF 330, or a combination thereof via the Mw interface.

The S-CSCF 330 may provide session set-up, provide session tear-down, provide session control and routing functions, generate records for billing purposes for all sessions under its control, and the like. For instance, the S-CSCF 330 may provide SIP registration (e.g., associate IP address of UE and SIP address) and session control for a registered UE session, including, e.g., determining whether to allow or deny service to the UE device 105, assigning an application server ("AS") to the UE device 105, enforce network operator policies, provide routing services, and the like. In some configurations, the S-CSCF 330 may communicate with the P-CSCF 320, the I-CSCF 325, or a combination thereof via the Mw interface.

The TAS/SCC AS function 335 may facilitate service centralization and continuity by functioning as a home network element that enables IMS centralized services ("ICS"), terminating access domain selection ("T-ADS"), and service continuity. For instance, the TAS/SCC AS function 335 may ensure service continuity and centralized control of communication services within the wireless communication network 100. In some configurations, the TAS/SCC AS function 335 may manage session initiation, session management, and resource allocation, and provide handover and fallback solutions to ensure ICS and service continuity (e.g., redirect a call to a different network in a case of network failure or congestions). Additionally, in some configurations, the TAS/SCC AS function 335 may provide supplementary multimedia services and basic call-processing services, including, e.g., digit analysis, voicemail, routing, call setup, call waiting, call forwarding, conferencing (e.g., conference bridges), caller ID service, origination-denial, termination-denial, etc. In some configurations, the TAS/SCC AS function 335 may invoke the MRF 340 to provide call progress tones, announcements, etc. The MRF 340 may provide media related functions, such as, e.g., media manipulation (e.g., voice stream mixing), playing of tones and announcements, etc.

The STIR-SHAKEN function 345 may facilitate call verification and classification for caller identification and authentication. For instance, in some configurations, the STIR-SHAKEN function 230 may validate that a call passing through the wireless communication network 100 is in fact from the number displayed on Caller ID to mitigate caller ID spoofing. For example, secure telephony identity revisited ("STIR") may be implemented by adding a digital certificate (or other information) to the SIP information used to initiate and route calls within a cellular network (e.g., the wireless communication network 100). Signature-based handling of asserted information using tokens ("SHAKEN") may provide guidelines that indicate how to handle calls with have incorrect or missing STIR information.

The BGCF 350 may be a SIP proxy that may determine the next hop for routing of SIP messages (e.g., determine a public switched telephone network ("PSTN") break out point for a session). For instance, in some configurations, the BGCF 350 may process requests for routing from the S-CSCF 330 when the S-CSCF 330 has determined that a session cannot be routed using a domain name system ("DNS") or electronic numbering ("ENUM") lookups.

The IBCF 355 may provide boundary control between various service provider networks and provide IMS network security in terms of signaling information. For instance, the IBCF 355 may perform SIP message screening and transport plan control, network topology hiding, etc. Accordingly, in some configurations, the IBCF 355 may be utilized as a gateway to external networks (e.g., the external network(s) 196 of FIG. 1). In some instances, the IBCF 355 may be a session border controller for a network-to-network interface ("NNI"). The IBCF 355 may provide network address translation ("NAT") and firewall functionality.

Accordingly, in some configurations, the integrated IMS function 205 may be a software application executable by the electronic processor 305 in the example illustrated and as specifically discussed below, although a similarly purposed module(s) can be implemented in other ways in other examples. The electronic processor 305 may execute the integrated IMS function 205 to facilitate delivery of multimedia communication, such as, e.g., voice, video, or text messaging, over IP networks. When executed by the electronic processor 305, the integrated IMS function 205 may perform or provide multimedia communication services or functionality for the IMS 130. For example, when executed by the electronic processor 305, the integrated IMS function 205 may perform or provide network functionality of the P-CSCF 320, the I-CSCF 325, the S-CSCF 330, the TAS/SCC AS function 335, the MRF 340, the STIR-SHAKEN function 345, the BGCF 350, the IBCF 355, or a combination thereof, such that, e.g., when the electronic processor 305 executes the integrated IMS function 205, the IMS server 300 provides network functionality that emulates network functionality provided by an IMS having a decentralized or distributed architectural framework.

Figure 4:
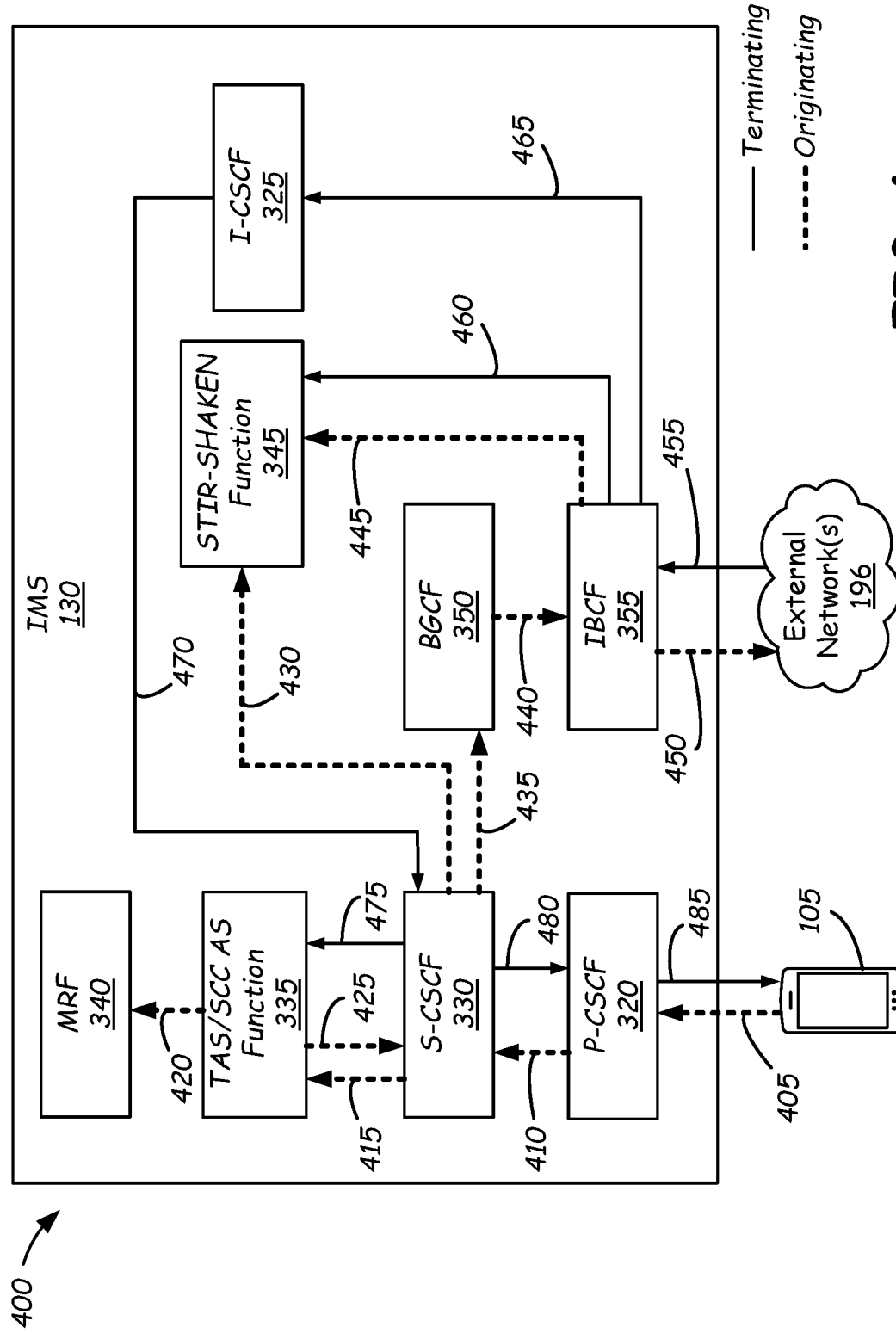
FIG. 4 illustrates an example communication diagram for originating and terminating a communication session in the IMS in accordance with some configurations.

FIG. 4 illustrates an example communication diagram 400 for originating and terminating a communication session in the IMS 130 in accordance with some configurations. In the communication diagram 400 of FIG. 4, the communication flow for terminating a communication session is illustrated using solid arrows while the communication flow for originating a communication session is illustrated using dashed arrows. To perform the illustrated communication session and flows, the IMS 130 may be implemented by the IMS server 300 of FIG. 3. For example, to perform the illustrated communication session and flows, the electronic processor 305 may execute the integrated IMS function 205 (including the IMS functions thereof) and may communicate with the UE device 105 and external network(s) 196 via the communication interface 315). The communication flow(s) illustrated in FIG. 4 are example communication flow(s) and, in some configurations, different communication flow(s) may be implemented by the wireless communication network 100 (e.g., the IMS 130). For example, communication may flow in a different order or sequence, a different direction, or between different components (e.g., different NFs) than illustrated in FIG. 4.

For originating a communication session, the P-CSCF 320 may receive a session request from the UE device 105 (represented in FIG. 4 by reference numeral 405). Although not illustrated in FIG. 4, the session request may be communicated from the UE device 105 to the IMS 130 via components of the wireless communication network 100 (e.g., the radio transceiver 112, the NR RAN 110, and the 5G Core 120). In response to receiving the session request, the P-CSCF 320 may identify (or otherwise determine) which S-CSCF to forward the session request to (e.g., the S-CSCF 330). After identifying the S-CSCF 330, the P-CSCF 320 may transmit the session request to the S-CSCF 330 (represented in FIG. 4 by reference numeral 410).

Responsive to receiving the session request, the S-CSCF 330 may initiate session set-up, provide session control and routing functions, generate records, and the like for the requested session. For instance, the S-CSCF 330 may determine to which application server(s) to forward the session request. For example, as illustrated in FIG. 4, the S-CSCF 330 may determine that the session request should be forwarded to the TAS/SCC AS 335 and forward the session request to the TAS/SCC AS 335 (represented in FIG. 4 by reference numeral 415).

The TAS/SCC AS 335 may facilitate service centralization and continuity by functioning as a home network element that enables ICS and service continuity. In some configurations, the TAS/SCC AS function 335 may manage session initiation, session management, and resource allocation for the requested session. Additionally, in some configurations, the TAS/SCC AS function 335 may provide supplementary multimedia services and basic call-processing services for the requested session. For example, as illustrated in FIG. 4, the TAS/SCC AS function 335 may invoke the MRF 340 to provide media related functions (e.g., call progress tones, announcements, etc.) (represented in FIG. 4 by reference numeral 420). The TAS/SCC AS function 335 may further communicate with the S-CSCF 330 (represented in FIG. 4 by reference numeral 425). For example, the S-CSCF 330 may request subscriber defined services from the TAS/SCC AS function 335 and, in reply, the TAS/SCC AS function 335 may provide the services or registration data for that subscriber.

As also illustrated in the example of FIG. 4, the S-CSCF 330 may communicate with the STIR-SHAKEN function 345 (represented in FIG. 4 by reference numeral 430) to facilitate call verification and classification for caller identification and authentication for the session. The S-CSCF 330 may also communicate with the BGCF 350 to enable the S-CSCF 330 to break out the call to a non-IMS network, such as, e.g., a CS-Network over SIP protocol (represented in FIG. 4 by reference numeral 435). The BGCF 350 may communicate with the IBCF 355 to enable NNI connectivity from one IMS network to another IMS network over SIP protocol (represented in FIG. 4 by reference numeral 440). The IBCF 355 may also communicate with the STIR-SHAKEN function 345 (represented in FIG. 4 by reference numeral 445). As noted herein the IBCF 355 may be utilized as a gateway to external networks (e.g., the external network(s) 196), such as, e.g., to facilitate termination of IMS calls to another IMS network with NNI connectivity over SIP protocol (represented in FIG. 4 by reference numeral 450).

As illustrated in FIG. 4, the communication flow for terminating a session may include the IBCF 355 receiving a message from the external network(s) 196 (represented in FIG. 4 by reference numeral 455). The IBCF 355 may then communicate with the STIR-SHAKEN function 345 (represented in FIG. 4 by reference numeral 460) and the I-CSCF 325 (represented in FIG. 4 by reference numeral 465). As noted herein, the I-CSCF 325 may be a SIP function and may forward SIP requests or responses to the S-CSCF 330 (represented in FIG. 4 by reference numeral 470). After receiving communication from the I-CSCF 325, the S-CSCF 330 may communicate with the TAS/SCC AS function 335 (represented in FIG. 4 by reference numeral 475) and then the P-CSCF 320 (represented in FIG. 4 by reference numeral 480), which further communicates with the UE device 105 (represented in FIG. 4 by reference numeral 485).

Figure 5:
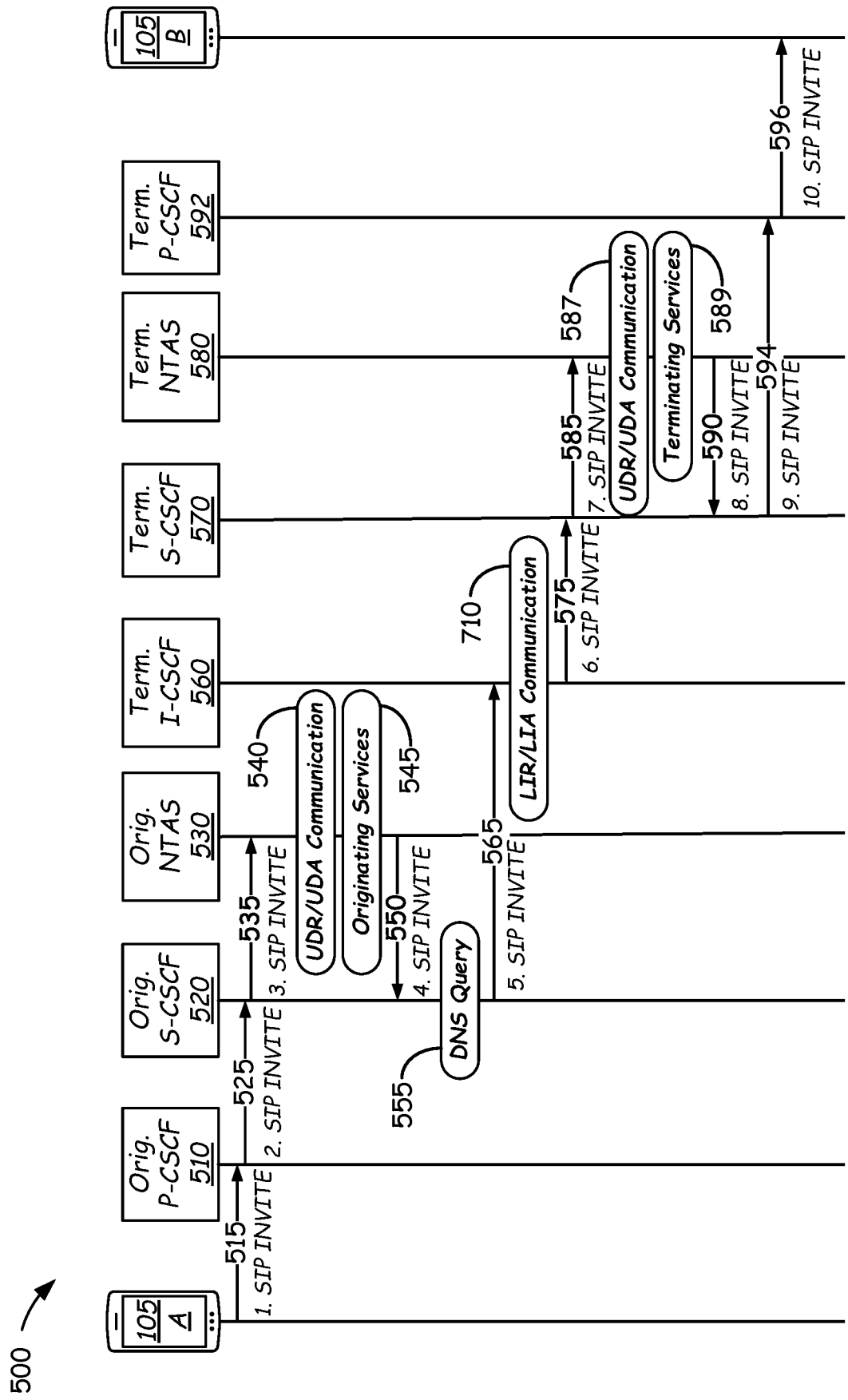
FIGS. 5-6 illustrate an example call flow for originating and terminating a communication session in accordance with some configurations.
Figure 6:
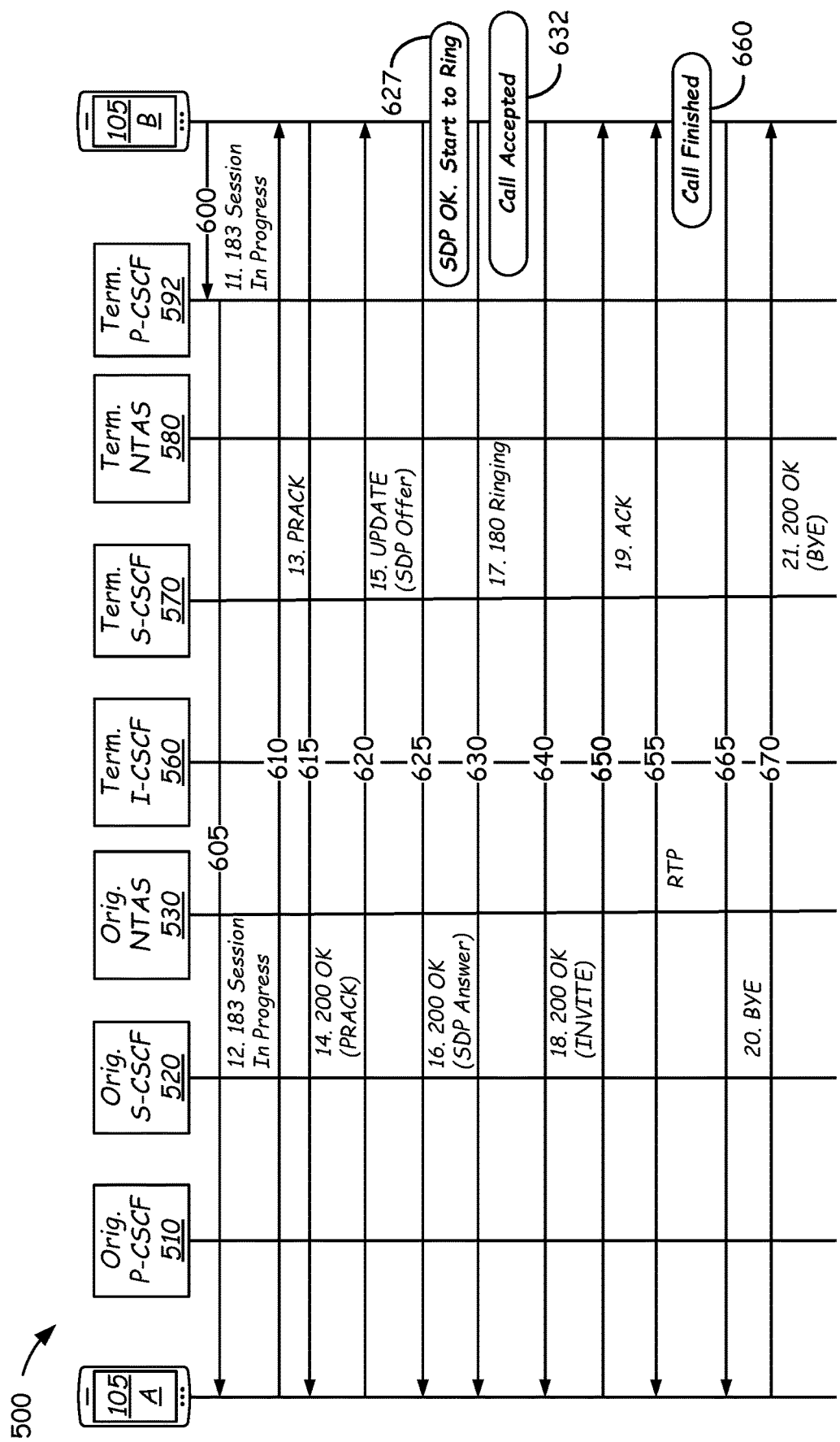

FIGS. 5-6 illustrate an example call flow 500 for originating and terminating a communication session between a first UE device 105A and a second UE device 105B in the IMS 130 in accordance with some configurations. The call flow illustrated in FIG. 5 is an example call flow and, in some configurations, different communication flow(s) may be implemented by the wireless communication network 100 (e.g., the IMS 130 via the integrated IMS function 205). For example, communication may flow in a different order or sequence, a different direction, or between different components (e.g., different NFs) than illustrated in FIG. 5.

In the example of FIG. 5, the first UE device 105A may initiate a call by providing a SIP INVITE message (e.g., an SDP Offer with Audio/Video Codec) to an originating P-CSCF 510 (e.g., the P-CSCF 320) (represented in FIG. 5 by reference numeral 515). The originating P-CSCF 510 may transmit the SIP INVITE message to an originating S-CSCF 520 (e.g., the S-CSCF 330) (represented in FIG. 5 by reference numeral 525). The originating S-CSCF 520 may provide the SIP INVITE message to an originating NTAS 530 (e.g., the TAS/SCC AS Function 335) (represented in FIG. 5 by reference numeral 535). The originating NTAS 530 may facilitate user-data-request ("UDR") and user-data-answer ("UDA") communication(s) with an HSS (represented in FIG. 5 by reference numeral 540) and provide originating services (represented in FIG. 5 by reference numeral 545). The originating NTAS 530 may provide the SIP INVITE message back to the originating S-CSCF 520 (represented in FIG. 5 by reference numeral 550)). The originating S-CSCF 520 may then facilitate a DNS query via communication with a DNS server (represented in FIG. 5 by reference numeral 555). After the DNS query, the originating S-CSCF 520 may transmit the SIP INVITE message to a terminating I-CSCF 560 (e.g., the I-CSCF 325) (represented in FIG. 5 by reference numeral 565). The terminating I-CSCF 560 may facilitate location-info-request ("LIR") and location-info-answer ("LIA") communication with the HSS (represented in FIG. 5 by reference numeral 565). The terminating I-CSCF 560 may then provide the SIP INVITE message to a terminating S-CSCF 570 (e.g., the S-CSCF 330) (represented in FIG. 5 by reference numeral 575), which may provide the SIP INVITE message to a terminating NTAS 580 (e.g., the TAS/SCC AS Function 335) (represented in FIG. 5 by reference numeral 585). The terminating NTAS 580) may facilitate UDR/UDA communication(s) with an HSS (represented in FIG. 5 by reference numeral 587) and provide terminating services (represented in FIG. 5 by reference numeral 589). The terminating NTAS 580 may provide the SIP INVITE message to the terminating S-CSCF 570) (represented in FIG. 5 by reference numeral 590). The terminating S-CSCF 570 may provide the SIP INVITE to a terminating P-CSCF 592 (e.g., the P-CSCF 320) (represented in FIG. 5 by reference numeral 594). The terminating P-CSCF 592 may provide the SIP INVITE message to the second UE device 105B (represented in FIG. 5 by reference numeral 596).

Continuing to FIG. 6, the call flow 500 further includes the second UE device 105B providing a 183 Session In Progress message to the terminating P-CSCF 592 (represented in FIG. 6 by reference numeral 600). The terminating P-CSCF 592 may forward the 183 Session In Progress message (e.g., a SDP Answer with Audio/Video Codec) to the first UE device 105A (represented in FIG. 6 by reference numeral 605. The first UE device 105A may provide a provisional response acknowledgement ("PRACK") message to the second UE device 105B (represented in FIG. 6 by reference numeral 610). The second UE device 105B may acknowledge the PRACK message by providing a 200 OK message to the first UE device 105A (represented in FIG. 6 by reference numeral 615). The first UE device 105A may provide an UPDATE message (e.g., an SDP Offer message) to the second UE device 105B (represented in FIG. 6 by reference numeral 620). Responsive to the UPDATE message, the second UE device 105B may provide a 200 OK message (e.g., an SDP Answer message) to the first UE device 105A (represented in FIG. 6 by reference numeral 625), which indicates that the SDP is satisfied and the call flow 500 may proceed to ringing (represented in FIG. 6 by reference numeral 627). The second UE device 105B may then provide a 180 Ringing message to the first UE device 105A (represented in FIG. 6 by reference numeral 630)). The second UE device 105B may determine that the call was accepted (represented in FIG. 6 by reference numeral 632) and provide a 200 OK message (e.g., a 200 OK (INVITE) message) (represented in FIG. 6 by reference numeral 640). Responsive to the 200 OK message, the first UE device 105A may provide an ACK message (e.g., an acknowledgement message) to the second UE device 105B (represented in FIG. 6 by reference numeral 650), which may indicate that the call is now ready to enter conversation mode. Accordingly, as illustrated in FIG. 6, the first UE device 105A and the second UE device 105B may communicate via real-time transport protocol ("RTP") (represented in FIG. 6 by reference numeral 655). When the call finishes (represented in FIG. 6 by reference numeral 660), the second UE device 105B may provide a BYE message to the first UE device 105A (represented in FIG. 6 by reference numeral 665). The first UE device 105A may then provide a 200 OK message (e.g., a 200 OK (BYE) message) acknowledging the BYE message (represented in FIG. 6 by reference numeral 670).

Accordingly, in some configurations, rather than providing IMS and video services via NFs that are distributed across multiple nodes (e.g., multiple servers, datacenters, base stations, etc.), the technology disclosed herein integrates the IMS functions 165 at a single server or node (e.g., the IMS server 300 of FIG. 3) such that, e.g., the IMS functions 165 are integrated (or otherwise combined) into a single IMS function that provides the functionality of each IMS function 165 (e.g., the integrated IMS function 205). In some examples, the IMS server 300 may be positioned at a location with (or integrated into) a base station, datacenter, or other elements of the wireless communication network 100. Such integration of the NFs at a single node or server provides IMS and voice service simplification and standardization within, e.g., a 5G SA network on a public cloud (e.g., the wireless communication network 100). As such, the technology disclosed herein provides a technical solution to the technical problems and challenges associated with an IMS having a decentralized architectural framework, as described in greater detail herein. Accordingly, in some configurations, the IMS server 300 (e.g., the electronic processor 305 executing the integrated IMS function 205) may simplify and standardize implementation of IMS or video services in a 5G standalone network on a public cloud.

Figure 7:
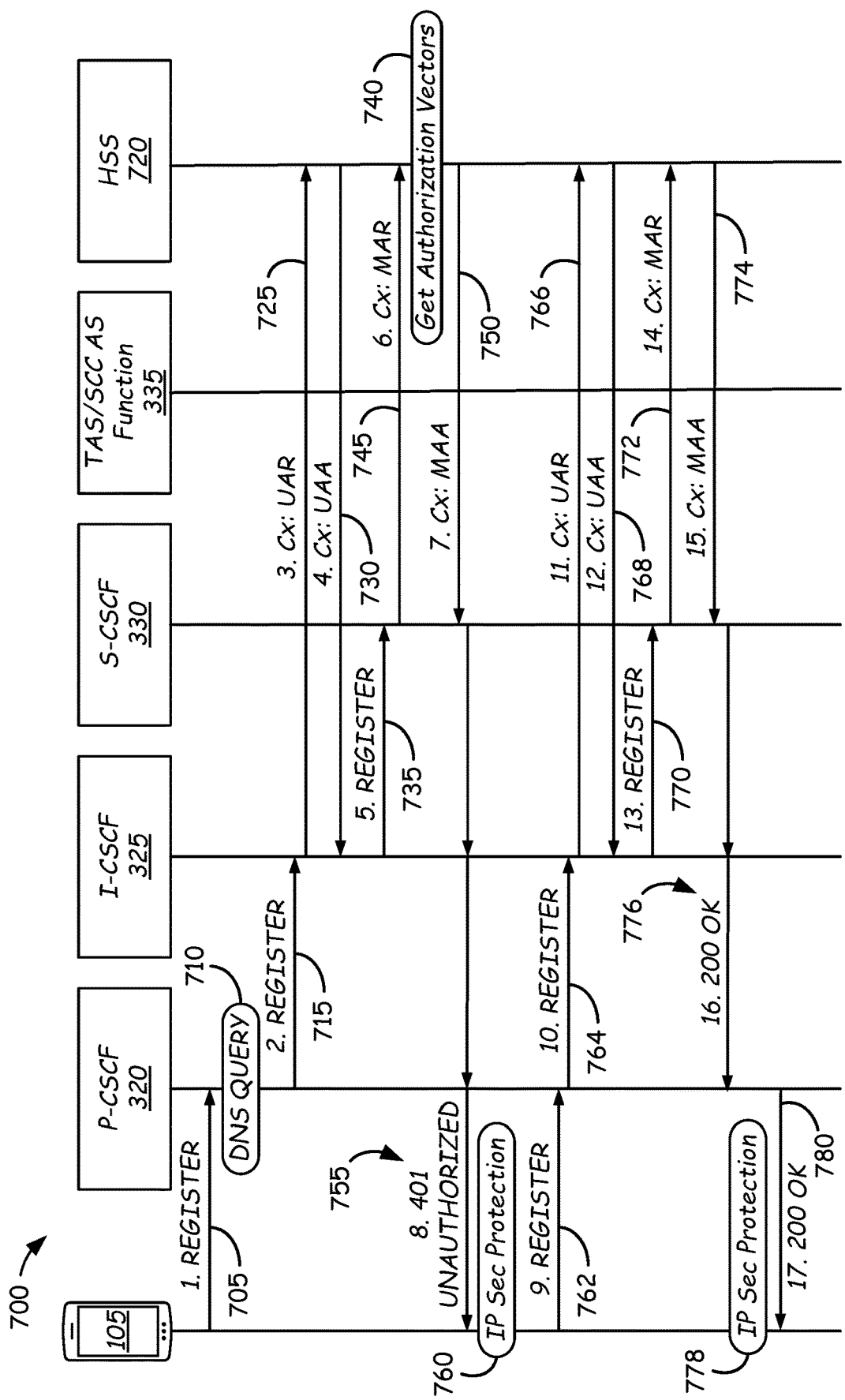
FIG. 7 illustrates an example call flow for registering a user equipment device in accordance with some configurations.

In some configurations, the IMS 130 (e.g., via execution of the integrated IMS function 205) may facilitate or otherwise provide registration of a UE device (e.g., the UE device 105). In some examples, the communication flow(s) of FIG. 4 may occur after the UE device 105 is registered with the IMS 130 (e.g., prior to originating a multimedia communication session). For example, FIG. 7 illustrates an example call flow 700 for registering the UE device 105 according to some configurations. As illustrated in FIG. 7, the UE device 105 may transmit a REGISTER request to the P-CSCF 320 (represented in FIG. 7 by reference numeral 705). In some instances, the P-CSCF 320 may facilitate a DNS query via communication with a DNS server (represented in FIG. 7 by reference numeral 710). The P-CSCF 320 may forward the REGISTER request to the I-CSCF 325 (represented in FIG. 7 by reference numeral 715).

The I-CSCF 325 may determine which S-CSCF should manage the REGISTER request. For example, in the illustrated example of FIG. 7, the I-CSCF 325 may transmit a user authorization request ("UAR") to an HSS 720 (represented in FIG. 7 by reference numeral 725 and the HSS 720 may provide a user authorization answer ("UAA") responsive to the UAR (represented in FIG. 7 by reference numeral 730). After identifying the S-CSCF 330 as the S-CSCF 330 to manage the REGISTER request (via interaction with the HSS 720), the I-CSCF 325 may forward the REGISTER request to the S-CSCF 330 (represented by reference numeral 735). In some instances, the S-CSCF 330 may interact with the HSS 720 to acquire authorization vectors (represented in FIG. 7 by reference numeral 740). For example, the S-CSCF 330 may transmit a multimedia authentication request ("MAR") to the HSS 720 and the HSS 720 may respond by transmitting a multimedia authentication answer ("MAA") back to the S-CSCF 330 (represented in FIG. 7 by reference numerals 745 and 750, respectively).

The S-CSCF 330 may transmit (via the P-CSCF 320 and the I-CSCF 325) a 401 UNAUTHORIZED response, including a challenge string, to the UE device 105 (represented in FIG. 7 by reference numeral 755). Responsive to receiving the 401 UNAUTHORIZED response, and the challenge string, the UE device 105 facilitate IP sec protection (represented in FIG. 7 by reference numeral 760). The UE device 105 may hash the challenge string and shared secrete data ("SSD"). Both the UE device 105 and the IMS 130 may store the SSD.

The UE device 105 may then send a subsequent REGISTER request to the P-CSCF 320 (represented in FIG. 7 by reference numeral 762), where the subsequent REGISTER request includes a result of the hashed challenge string and SSD. The P-CSCF 320 may forward the subsequent REGISTER request to the I-CSCF 325 (represented in FIG. 7 by reference numeral 764). The I-CSCF 325 may determine which S-CSCF should manage the subsequent REGISTER request. For example, in the illustrated example of FIG. 7, the I-CSCF 325 may transmit a subsequent UAR to the HSS 720 (represented in FIG. 7 by reference numeral 766) and the HSS 720 may provide a subsequent UAA responsive to the UAR (represented in FIG. 7 by reference numeral 768).

After identifying the S-CSCF 330 as the S-CSCF 330 to manage the subsequent REGISTER request (via interaction with the HSS 720), the I-CSCF 325 may forward the subsequent REGISTER request to the S-CSCF 330 (represented by reference numeral 770)). The S-CSCF 330 may transmit a subsequent MAR to the HSS 720 and the HSS 720 may respond by transmitting a subsequent MAA multimedia authentication answer back to the S-CSCF 330 (represented in FIG. 7 by reference numerals 772 and 774, respectively). The S-CSCF 330 may then transmit (through, e.g., the I-CSCF 325) a 200-OK response to the P-CSCF 320 (represented in FIG. 7 by reference numeral 776). The UE device 105 facilitate IP sec protection (represented in FIG. 7 by reference numeral 778). The UE device 105 may the receive the 200-OK response from the P-CSCF 320 (represented in FIG. 7 by reference numeral 780).

Figure 8:
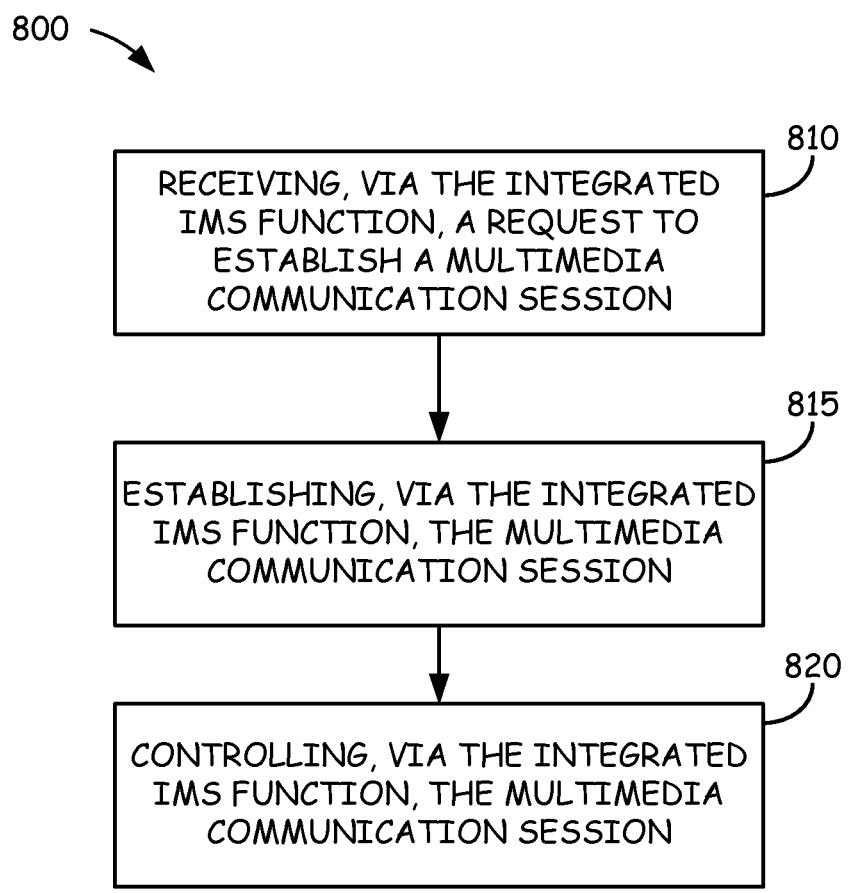
FIG. 8 is a flowchart illustrating a method for implementing IMS and voice services in a standalone cellular network in accordance with some configurations.

FIG. 8 is a flowchart illustrating a method 800 for implementing IMS and voice service in a wireless communication network according to some configurations. The method 800 is described as being performed by the IMS server 300 and, in particular, the electronic processor 305 executing the IMS 130 (or the IMS functions 165 thereof). However, at least in some examples, the functionality described with respect to the method 800 can be performed by another computing device.

As illustrated in FIG. 8, the method 800 includes, at block 810, receiving, by the electronic processor 305 via the integrated IMS function 205 (e.g., the P-CSCF 320, the IBCF 355, etc.), a request to establish a multimedia communication session from a UE device (e.g., the UE device 105) over the wireless communication network 100. For example, the electronic processor 305 of the IMS server 300 may execute the integrated IMS function 205 (e.g., FIG. 3) to implement the IMS 130 of the wireless communication network 100 (e.g., FIG. 1). During execution of the integrated IMS function 205, the electronic processor 305 may receive the request from the UE device 105 via the wireless communication network 100. In some configurations, a multimedia communication session may be between multiple UE devices (e.g., a first UE device, a second UE device, etc.), between a single UE device (e.g., the UE device 105) and a multimedia application server (e.g., an MRF-announcement server, a voicemail server, a video streaming server, etc.), or the like. Accordingly, in some configurations, the request may specify one or more entities or parties of the multimedia communication session. For instance, in some examples, the request may specify a second device of the external network 196 (e.g., a second UE device of the external network 196) with which to establish the multimedia communication session.

At block 815, the electronic processor 305 establishes, via the integrated IMS function 205 (e.g., the I-CSCF 325, the S-CSCF 330, the STIR-SHAKEN function 345, the BGCF 350, etc.), the multimedia communication session based on the request. For example, the electronic processor 305 may execute integrated IMS function 205 to process the request according to the communication flow for originating a communication session as described with respect to FIG. 4.

At block 820, the electronic processor 305 controls, via the integrated IMS function 205 (e.g., the TAS/SCC AS function 335, the MRF 340, etc.), the multimedia communication session over the wireless communication network 100. In some configurations, the electronic processor 305 executes the integrated IMS function 205 in order to facilitate multimedia communication via the IMS 130. For example, the electronic processor 305 may facilitate the transmission of multimedia communication or data for the multimedia communication session, such as, e.g., the transmission of multimedia communication(s) between the UE device(s) 105 participating in the multimedia communication session.

The integrated IMS function 205 may include the P-CSCF 320, the S-CSCF 330, the I-CSCF 325, the TAS/SCC AS 335, the MRF 340, the STIR-SHAKEN function 345, the BGCF 350, the IBCF 355, or a combination thereof. Accordingly, the integrated IMS function 205 may facilitate session border control for a user-network interface between UE devices and the IMS 130 (e.g., via the P-CSCF 320), identify a S-CSCF to control the multimedia communication session and route messages to the S-CSCF (e.g., via the I-CSCF 325), control the multimedia communication session (e.g., via the S-CSCF 330), register UE devices (e.g., via the S-CSCF 330), facilitate service centralization and continuity for the multimedia communication session (e.g., via the TAS/SCC AS 335), provide supplementary multimedia services for the multimedia communication session (e.g., via the TAS/SCC AS 335), facilitate call verification and classification for caller identification and authentication (e.g., via the STIR-SHAKEN function 345), process requests when the multimedia communication session cannot be routed using a domain name system or electronic numbering lookups (e.g., via the BGCF 350), provide boundary control for a NNI between the IMS and at least one external network 196 (e.g., via the IBCF 355). Accordingly, in some configurations, the integrated IMS function 205 may perform the method 800 (or a portion thereof) by providing network functionality associated with the P-CSCF 320, the S-CSCF 330, the I-CSCF 325, the TAS/SCC AS 335, the MRF 340, the STIR-SHAKEN function 345, the BGCF 350, the IBCF 355, or a combination thereof.

In some examples of the method 800, after controlling the multimedia communication session, the electronic processor 305 may terminate the multimedia communication session. For example, the electronic processor 305 may execute integrated IMS function 205 to process a request from, e.g., the external network 196 to terminate the multimedia communication session according to the communication flow for terminating a communication session as described with respect to FIG. 4.

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, examples of the technology can be implemented as a set of instructions, tangibly embodied on a non-transitory computer-readable media, such that a processor device can implement the instructions based upon reading the instructions from the computer-readable media. Some examples of the technology can include (or utilize) a control device such as an automation device, a special purpose or general-purpose computer including various computer hardware, software, firmware, and so on, consistent with the discussion below: As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

Certain operations of methods according to the technology, or of systems executing those methods, can be represented schematically in the FIGs. or otherwise discussed herein. Unless otherwise specified or limited, representation in the FIGs. of particular operations in particular spatial order can not necessarily require those operations to be executed in a particular sequence corresponding to the particular spatial order. Correspondingly, certain operations represented in the FIGs., or otherwise disclosed herein, can be executed in different orders than are expressly illustrated or described, as appropriate for particular examples of the technology. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as "either," "one of," "only one of," or "exactly one of."

Although the present technology has been described by referring to preferred examples, workers skilled in the art will recognize that changes can be made in form and detail without departing from the scope of the discussion.

What is claimed is:

1. A method of implementing an IP multimedia services or subsystem ("IMS") within a communication network, the method comprising:
receiving, with an electronic processor via an integrated IMS function that executes a plurality of IMS network functions within a centralized architectural framework of the IMS, a request to establish a multimedia communication session for a user equipment ("UE") device over the communication network, wherein the integrated IMS function includes a P-CSCF, an I-CSCF, a S-CSCF, a TAS/SCC AS function, a STIR-SHAKEN function, a BGCF function, and an IBCF as the integrated IMS function;
establishing, with the electronic processor via the integrated IMS function, the multimedia communication session based on the request; and
controlling, with the electronic processor via the integrated IMS function, the multimedia communication session for the UE device over the communication network.

2. The method of claim 1, further comprising:
integrating at least two of the P-CSCF, the I-CSCF, the S-CSCF, the TAS/SCC AS function, the STIR-SHAKEN function, the BGCF function, or the IBCF as the integrated IMS function.

3. The method of claim 1, further comprising:
facilitating, via the integrated IMS function, session border control for a user-network interface between the UE device and the IMS.

4. The method of claim 1, further comprising:
facilitating, via the integrated IMS function, service centralization and continuity for the multimedia communication session; and
providing, via the integrated IMS function, supplementary multimedia services for the multimedia communication session,
wherein the supplementary multimedia services include at least one of voicemail, routing, call setup, call waiting, call forwarding, conferencing, or caller ID.

5. A system of implementing an IP multimedia services or subsystem ("IMS") within a communication network, the system comprising:
a server configured to facilitate multimedia communication services via a centralized architectural framework of the IMS, the server including:
a memory storing an integrated IMS function, wherein the integrated IMS function is configured to execute a plurality of IMS network functions, wherein the plurality of IMS network functions includes a Proxy Call Session Control Function ("P-CSCF"), an Interrogating Call Session Control Function ("I-CSCF"), a Serving Call Session Control Function ("S-CSCF"), a telephony application server or service centralization and continuity application server ("TAS/SCC AS") function, a STIR-SHAKEN function, a Breakout Gateway Control Function ("BGCF"), and an Interconnect Border Control Function ("IBCF"); and
an electronic processor communicatively coupled to the memory, the electronic processor configured to:
receive, with the integrated IMS function, a request to establish a multimedia communication session between two or more user equipment ("UE") devices over the communication network;
establish, with the integrated IMS function, the multimedia communication session; and
control, with the integrated IMS function, the multimedia communication session between the two or more UE devices over the communication network.

6. The system of claim 5, wherein the integrated IMS function includes the P-CSCF configured to facilitate session border control for a user-network interface between at least one of the two or more UE devices and the IMS.

7. The system of claim 5, wherein the integrated IMS function includes the I-CSCF configured to identify the S-CSCF to control the multimedia communication session and route messages to the S-CSCF.

8. The system of claim 5, wherein the integrated IMS function includes the S-CSCF configured to control the multimedia communication session, wherein the S-CSCF is configured to register at least one of the two or more UE devices.

9. The system of claim 5, wherein the integrated IMS function includes the TAS/SCC AS a telephony application server or service centralization and continuity application server ("TAS/SCC AS") function configured to facilitate service centralization and continuity for the multimedia communication session.

10. The system of claim 9, wherein the TAS/SCC AS function is configured to provide supplementary multimedia services for the multimedia communication session, wherein the supplementary multimedia services include at least one of voicemail, routing, call setup, call waiting, call forwarding, conferencing, or caller ID.

11. The system of claim 5, wherein the integrated IMS function includes the STIR-SHAKEN function configured to facilitate call verification and classification for caller identification and authentication.

12. The system of claim 5, wherein the integrated IMS function includes the BGCF configured to process requests when the multimedia communication session cannot be routed using a domain name system or electronic numbering lookups.

13. The system of claim 5, wherein the integrated IMS function includes the IBCF configured to provide boundary control for a network-to-network interface between the IMS and at least one external network.

14. The system of claim 5, wherein the integrated IMS function is configured to emulate network functionality of each IMS network function included in the plurality of IMS network functions.

15. The system of claim 5, wherein the integrated IMS function is configured to execute a plurality of IMS micro services, wherein each IMS micro service of the plurality of IMS micro services provides functionality of an IMS network function included in the plurality of IMS network functions.

16. The system of claim 5, wherein each of the plurality of IMS network functions are cloud-native network functions.

17. A non-transitory, computer-readable medium storing instructions that, when executed by an electronic processor, perform a set of functions, the set of functions comprising:
receiving, with an integrated IP multimedia services or subsystem ("IMS") function emulating a plurality of IMS network functions for an IMS implemented via a centralized architecture framework, a request to establish a multimedia communication session for a user equipment ("UE") device over the communication network, wherein the integrated IMS function includes a P-CSCF, an I-CSCF, a S-CSCF, a TAS/SCC AS function, a STIR-SHAKEN function, a BGCF function, and an IBCF as the integrated IMS function;
establishing, with the integrated IMS function, the multimedia communication session based on the request; and
controlling, with the integrated IMS function, the multimedia communication session for the UE device over the communication network.

18. The computer-readable medium of claim 17, wherein the communication network is a standalone 5G network.

19. The computer-readable medium of claim 17, wherein the set of functions further comprises:
terminating, with the integrated IMS function, the multimedia communication session responsive to a request to terminate the multimedia communication session.

* * * * *

UNITED STATES PATENT AND TRADEMARK OFFICE
CERTIFICATE OF CORRECTION

PATENT NO. : 12,273,396 B2
APPLICATION NO. : 18/463071
DATED : April 8, 2025
INVENTOR(S) : Mohammad Dawood Shahdad et al.

Page 1 of 1

It is certified that error appears in the above-identified patent and that said Letters Patent is hereby corrected as shown below:

In the Claims

Claim 4, Column 20, Line 17, "communication session, wherein" should be --communication session, and wherein--.

Claim 9, Column 20, Line 66, "the TAS/SCC AS a telephony application server or service centralization and continuity application server ("TAS/SCC AS")" should be --the TAS/SCC AS function configured to facilitate service centralization and continuity for the multimedia communication session--.

Signed and Sealed this
Twenty-seventh Day of May, 2025

Coke Morgan Stewart
*Acting Director of the United States Patent and Trademark Office*